(12) United States Patent
Chen et al.

(10) Patent No.: US 12,207,313 B2
(45) Date of Patent: Jan. 21, 2025

(54) TRANSMISSION METHOD, TERMINAL AND STORAGE MEDIUM FOR RANDOM ACCESS BASED ON SPATIAL INFORMATION

(71) Applicant: VIVO MOBILE COMMUNICATION CO., LTD., Guangdong (CN)

(72) Inventors: Xiaohang Chen, Guangdong (CN); Yumin Wu, Guangdong (CN); Yu Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 229 days.

(21) Appl. No.: 17/734,752

(22) Filed: May 2, 2022

(65) Prior Publication Data

US 2022/0264661 A1 Aug. 18, 2022

Related U.S. Application Data

(63) Continuation of application No. PCT/CN2020/126066, filed on Nov. 3, 2020.

(30) Foreign Application Priority Data

Nov. 4, 2019 (CN) .......................... 201911068045.1

(51) Int. Cl.
*H04W 74/0833* (2024.01)
*H04B 7/0408* (2017.01)
(Continued)

(52) U.S. Cl.
CPC ...... *H04W 74/0841* (2013.01); *H04B 7/0695* (2013.01); *H04W 56/001* (2013.01); *H04W 76/19* (2018.02)

(58) Field of Classification Search
CPC ........... H04W 74/0841; H04W 56/001; H04W 76/19; H04W 72/046; H04W 74/0833;
(Continued)

(56) References Cited

U.S. PATENT DOCUMENTS

2019/0052339 A1 2/2019 Zhou et al.
2019/0141693 A1* 5/2019 Guo .................. H04W 72/1268
(Continued)

FOREIGN PATENT DOCUMENTS

CN 109644358 A 4/2019
CN 110167036 A 8/2019
(Continued)

OTHER PUBLICATIONS

CATT, "BFR on SCell,", R2-1804483, 3GPP TSG-RAN WG2#101bis, Apr. 20, 2018, 4 pgs.
(Continued)

*Primary Examiner* — Harry H Kim
(74) *Attorney, Agent, or Firm* — Fredrikson & Byron, P.A.

(57) ABSTRACT

Embodiments of the present disclosure provide a transmission method and a device. The method includes: determining first spatial information; and receiving, in CSS and/or USS according to the first spatial information, a random access response message of a 2-step random access procedure triggered by beam failure recovery (BFR). The terminal can receive, in common search space and/or UE-specific search space, the random access response message of the 2-step random access procedure triggered by the beam failure recovery (BFR), so that reliability of a communications system can be improved.

17 Claims, 5 Drawing Sheets

(51) Int. Cl.
*H04B 7/06* (2006.01)
*H04L 5/00* (2006.01)
*H04W 56/00* (2009.01)
*H04W 72/044* (2023.01)
*H04W 72/23* (2023.01)
*H04W 74/00* (2009.01)
*H04W 76/19* (2018.01)

(58) Field of Classification Search
CPC .. H04W 74/008; H04W 72/23; H04B 7/0695; H04B 7/0408; H04L 5/0091
See application file for complete search history.

(56) References Cited

U.S. PATENT DOCUMENTS

| | | | |
|---|---|---|---|
| 2019/0253308 A1 | 8/2019 | Huang et al. | |
| 2021/0120594 A1* | 4/2021 | Lei | H04L 5/0053 |
| 2021/0321360 A1* | 10/2021 | Wong | H04W 68/00 |
| 2022/0149919 A1* | 5/2022 | Takahashi | H04W 56/001 |
| 2022/0264493 A1* | 8/2022 | Harada | H04W 56/00 |

FOREIGN PATENT DOCUMENTS

| | | |
|---|---|---|
| CN | 110213819 A | 9/2019 |
| CN | 110351112 A | 10/2019 |
| KR | 1020190100887 A | 8/2019 |
| WO | 2019083278 A1 | 4/2020 |
| WO | 2020096679 A1 | 5/2020 |
| WO | 2020192286 A1 | 10/2020 |

OTHER PUBLICATIONS

Sony, "Discussion on Procedure for 2-step RACH", R1-1910744, 3GPP TSG RAN WG1 #98bis, Oct. 20, 2019, 6 pgs.
International Application No. PCT/CN2020/126066 International Search Report and Written Opinion with Partial English Machine Translation mailed Feb. 5, 2021, 8 pgs.
Sony, "Discussion on Procedure for 2-step RACH", R1-1908763, 3GPP TSG RAN WG1 #98, Aug. 30, 2019, 6 pgs.
VIVO "Discussion on the Trigger Events of 2-step RACH", 3GPP Draft; R2-1903073, 3GPP TSG-RAN WG2 Meeting #105bis, Apr. 12, 2019, 4 pgs.
Examination Report for corresponding India application 202217031281 issued Oct. 7, 2022, 5 pgs.
Extended European search report for corresponding EP patent application 20884626.1, dated Oct. 19, 2022, 9 pgs.
First Office Action for corresponding Chinese application 201911068045.1 issued Aug. 25, 2022, with English machine translation, 14 pgs.
Second Office Action for corresponding Chinese application 201911068045.1 issued Feb. 2, 2023, untranslated, 7 pgs.
ZTE Corporation Remaining Stage 2 issues for 2-step RACH, R2-1913367, 3GPP TSG RAN WG2, Meeting #107bis, Oct. 18, 2019, 7 pgs.
Ericsson, "Analysis of RRC impact from multi-beam enhancements", 3GPP TSG-RAN WG2, Conference Oct. 14, 2019, pp. 1-14.

* cited by examiner

TRANSMISSION METHOD, TERMINAL AND STORAGE MEDIUM FOR RANDOM ACCESS BASED ON SPATIAL INFORMATION

CROSS-REFERENCE TO RELATED APPLICATIONS

The present disclosure is a continuation of International Application No. PCT/CN2020/126066, filed on Nov. 3, 2020, which claims the priority of Chinese Patent Application No. 201911068045.1 filed in China on Nov. 4, 2019, entire contents of which are hereby incorporated by reference.

TECHNICAL FIELD

Embodiments of the present disclosure relate to the field of communications technologies, and in particular to a transmission method and device.

BACKGROUND

In an existing mechanism, a terminal (User Equipment, UE) initiates a beam failure recovery (Beam Failure Recovery, BFR) procedure through a 2-step random access channel (Random Access Channel, RACH) after a beam failure.

However, when a base station receives a random access message, it cannot be determined whether the UE initiates a random access procedure due to the BFR, cause that the UE cannot receive a random access response message correctly.

SUMMARY

Embodiments of the present disclosure provide a transmission method and a device.

According to a first aspect of the present disclosure, a transmission method is provided, which includes:
  determining first spatial information; and
  receiving, in CSS and/or USS according to the first spatial information, a random access response message of a 2-step random access procedure triggered by beam failure recovery (BFR).

According to a second aspect of the present disclosure, a terminal is provided, which includes:
  a first determining module, configured to determine first spatial information; and
  a receiving module, configured to receive, in CSS and/or USS according to the first spatial information, a random access response message of a 2-step random access procedure triggered by beam failure recovery (BFR).

According to a third aspect of the present disclosure, a terminal is provided, which includes: a processor, a memory, and a program that is stored in the memory and that can be run on the processor, where when the program is executed by the processor, the steps of the transmission method according to the first aspect are implemented.

According to a fourth aspect of the present disclosure, a computer-readable storage medium is provided, where the computer-readable storage medium stores a computer program, and when the computer program is executed by a processor, the steps of the transmission method according to the first aspect are implemented.

BRIEF DESCRIPTION OF DRAWINGS

It becomes clear for a person of ordinary skill in the art to learn various other advantages and benefits by reading detailed description of the following optional implementations. The accompanying drawings are merely used to show the preferred implementations, and are not considered as limitations to the present disclosure. In addition, in all the accompanying drawings, a same reference symbol is used to represent a same part. In the accompanying drawings.

DESCRIPTION OF EMBODIMENTS

To better understand the embodiments of the present disclosure, the following technical points are introduced first:

Compared with a previous mobile communications system, the fifth generation (fifth-generation, 5G) mobile communication technology system needs to adapt to more diverse scenarios and service needs. Main scenarios of new radio (New Radio, NR) include: an enhanced mobile broadband (Enhanced Mobile Broadband, eMBB), massive machine-type communications (massive machine-type communications, mMTC), and ultra-reliable and low latency communications (Ultra-reliable and Low Latency Communications, URLLC). These scenarios require high reliability, low latency, a large bandwidth, wide coverage of systems, and the like.

(1) Preamble (Preamble)

In a traditional uplink transmission mode, if UE needs to send uplink data, the UE must first obtain uplink timing synchronization through a random access procedure, that is, obtain uplink timing advance (Timing advance, TA) information from a network. After uplink synchronization is obtained, the UE may send uplink data through dynamic scheduling or semi-static scheduling.

If an uplink data packet is small, a way of sending the uplink data after uplink synchronization is obtained through the random access procedure will cause consumption of resources and power. Therefore, in a mMTC scenario, the UE may send the uplink data in an asynchronous state.

Figure 1:
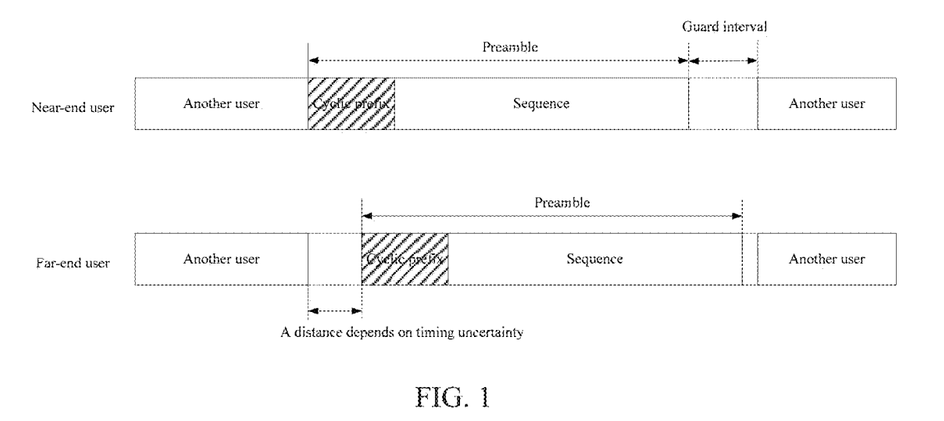
FIG. 1 is a schematic diagram of a preamble (Preamble)

Similar to the random access procedure, the UE is also in the asynchronous state when sending the preamble. Therefore, a cyclic prefix (Cyclic Prefix, CP) needs to be added to the preamble to balance out the impact of transmission delay, as shown in FIG. 1.

(2) 4-Step Random Access Procedure

Figure 2:
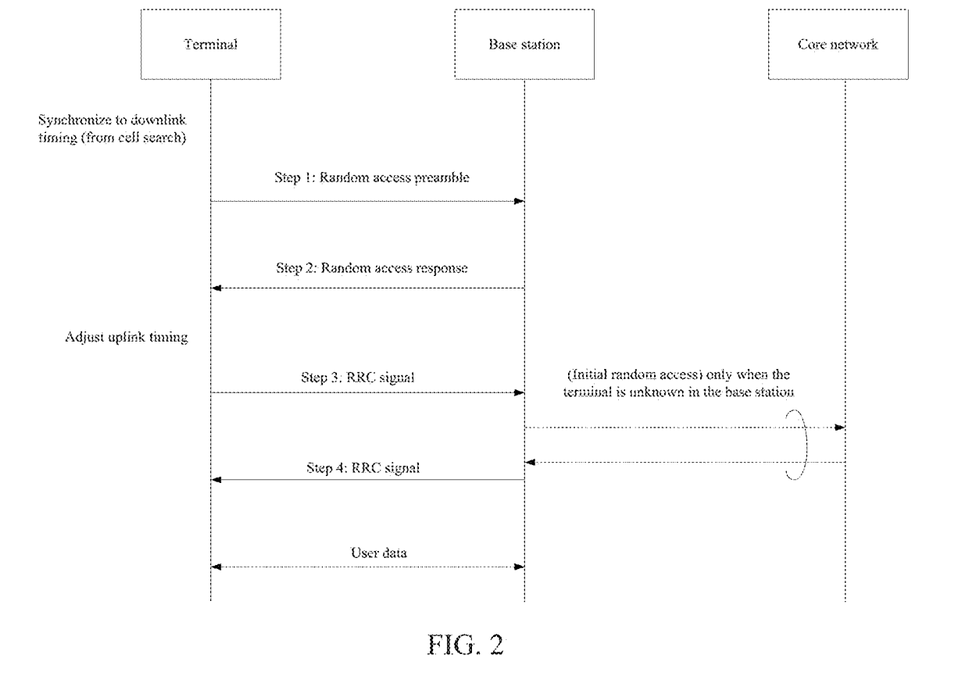
FIG. 2 is a schematic diagram of a 4-step random access procedure.

Referring to FIG. 2, in a 4-step RACH, the UE first sends a msg1, including a preamble, to a network. After detecting the preamble, the network will send a msg2, including a random access response (Random Access Response, RAR)

message corresponding to the preamble. Upon receiving the msg2, the UE sends a msg3 according to an instruction of the RAR. Upon receiving the msg3, the network will send a msg4, including a contention resolution ID (contention resolution ID). After the UE receives the msg4, 4-step random access is completed.

Figure 3:
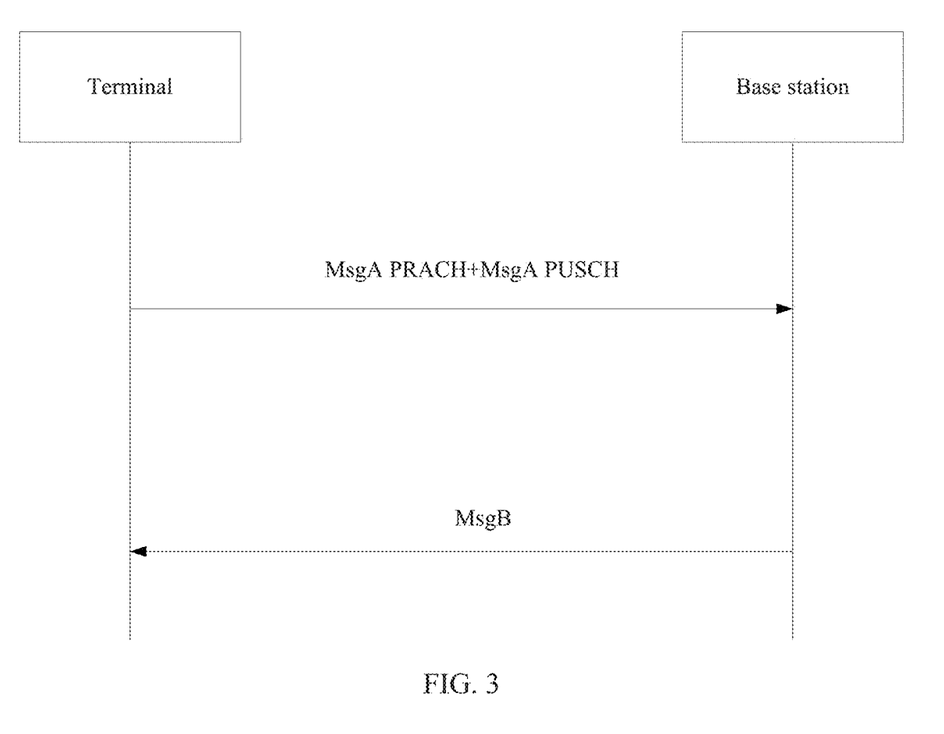
FIG. 3 is a schematic diagram of a 2-step random access procedure.

(3) 2-Step Random Access (2-Step RACH) Procedure the 2-step random access procedure is introduced to the NR. Alternatively, when initiating the random access procedure, the terminal may send a random access message (MsgA) to the network. The MsgA includes a physical random access channel (Physical Random Access Channel, PRACH) and a physical uplink shared channel (Physical Uplink Shared Channel, PUSCH). The PRACH carries the preamble, and the PUSCH carries information such as a terminal identity (Identity, ID). After receiving the MsgA, the network sends a MsgB to the terminal. The MsgB carries a message carrying the RAR and contention resolution ID, as shown in FIG. 3. After the terminal receives the MsgB carrying the corresponding competition resolution ID, the 2-step random access procedure is completed.

Main application scenarios of the 2-step RACH include a small base station (small cell), an unlicensed frequency band, a low-complexity terminal, and the like. The 2-step RACH can reduce time delay of the random access procedure, signaling overhead required for the random access procedure, power consumption for the terminal to perform the random access procedure, and the like. In addition, the 2-step RACH may be implemented in the random access procedure, and uplink data may be transmitted simultaneously. For example, the uplink data is transmitted in an inactive (inactive) or idle (idle) state, which can further reduce power consumption of a low power consumption terminal.

(4) PRACH Occasions (Occasions)

In the NR, multiple PRACH transmission occasions (PRACH transmission occasion also refers a physical random access channel transmission occasion, a PRACH occasion, or a physical random access channel occasion) being frequency division multiplexed (Frequency Division Multiplexing, FDM) may be configured at a time point (time instance, that is, time duration required to transmit a PRACH resource, also refers to a time domain position for transmitting the PRACH) may be configured for the base station. Here, for simplicity, the PRACH occasion is called RO for short. The number of ROs that can perform the FDM in a time instance may be: $\{1, 2, 4, 8\}$.

A random access preamble may only be transmitted on a time domain resource configured for a parameter PRACHConfigurationIndex, and the random access preamble may only be transmitted on a frequency domain resource configured for a parameter prach-FDM. A PRACH frequency resource number is $n_{RA} \in \{0, 1, \ldots, M-1\}$, where M is equal to a higher layer parameter prach-FDM. During initial access, the PRACH frequency domain resource number $n_{RA}$ is numbered in ascending order starting from an RO resource with the lowest frequency in an initial active uplink bandwidth part (initial active uplink bandwidth part). Otherwise, the PRACH frequency domain resource number $n_{RA}$ is numbered in ascending order starting from an RO resource with the lowest frequency in an active uplink bandwidth part (active uplink bandwidth part).

Figure 4:
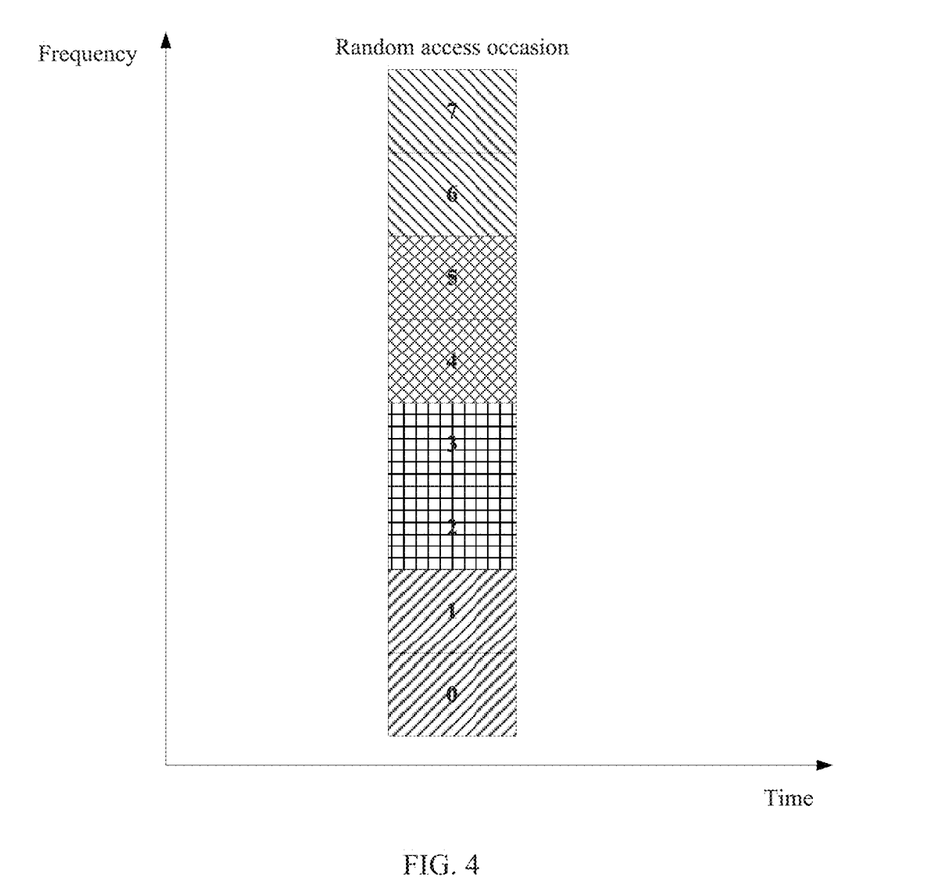
FIG. 4 is a schematic diagram of PRACH occasions (occasions)

In the NR, there is an association between the RO and an actually sent synchronization signal block (SS/PBCH block, SSB). One RO may be associated with a plurality of SSBs, and the number of SSBs associated with one RO may be $\{1/8, 1/4, 1/2, 1, 2, 4, 8, 16\}$. In a non-contention-based random access procedure, there may also be an association between an RO and a channel state information reference signal (Channel State Information Reference Signal, CSI-RS), as shown in FIG. 4.

The number of ROs of the FDM in one time instance is 8, and the number of actually transmitted SSBs is 4. For example, corresponding SSBs are SSB #0, SSB #1, SSB #2, and SSB #3, and each SSB is associated with 2 ROs. If the UE sends the PRACH on a RO corresponding to a SSB0, the UE selects one RO from R0#0 and R0#1 to send the PRACH.

(5) A Beam Failure Recovery (Beam Failure Recovery, BFR) Mechanism

In a high-frequency band communications system, because a wavelength of a wireless signal is relatively short, a case that a signal is blocked or the like tends to occur during propagation, and consequently signal propagation is interrupted. If wireless link reconstruction in the prior art is used, it will take a long time. Therefore, a primary cell (Primary Cell, PCell) beam failure recovery mechanism is introduced in release 15 (Release 15) of the 3rd generation partnership project (3rd Generation Partnership Project, 3GPP). The mechanism is mainly divided into the following four contents.

Beam failure detection (Beam failure detection): a terminal measures a beam failure detection reference signal (beam failure detection reference signal) at a physical layer, and it is determined, based on a measurement result, that whether a beam failure event occurs. A condition for determining is as follows: if a metric (metric) of all serving beams (serving beam) meets a preset condition (for example, exceeding a preset threshold) by detection, it is determined that a beam failure instance (beam failure instance) occurs, and the physical layer of the UE reports an indication to a higher layer (such as a Media Access Control (MAC) layer) to the UE, and the reporting is periodic. On the contrary, if it is determined by the physical layer of the UE that no beam failure instance occurs, the UE does not send an indication to the higher layer. The higher layer of the UE counts, by using a counter (counter), a quantity of indications reported at the physical layer. When a maximum quantity of indications configured by a network is reached, the UE declares that a beam failure event occurs.

A new candidate beam identification (New candidate beam identification): the terminal measures a candidate beam reference signal (candidate beam RS) at the physical layer to look for a new candidate beam (candidate beam). This step does not have to be performed after the occurrence of the beam failure event (beam failure event), but may also be performed before the occurrence of the beam failure event. When the physical layer of the UE receives a request, an indication, or a notification from the higher layer (for example, the MAC layer) of the UE, the physical layer reports a measurement result that meets a preset condition (measurement quality of the candidate beam RS exceeds a preset layer 1 reference signal received power (Layer 1 Reference Signal Received Power, L1-RSRP) threshold) to the higher layer of the UE. The report content is {candidate beam RS index, L1-RSRP}, and the higher layer of the UE selects a candidate beam (candidate beam) based on the report by the physical layer.

Transmission of a beam failure recovery request (Beam failure recovery request, BFRQ): a PRACH resource (resource) is determined by the MAC layer of the UE according to a selected candidate beam. If it is determined by the UE that a trigger condition of the BFRQ is met, the UE sends the BFRQ to the base station on a contention-free PRACH. The terminal needs to send the BFRQ based on a quantity of times and/or a timer (timer) for sending the BFRQ configured by the network. After the UE sends the BFRQ, if a physical downlink control channel (Physical Downlink Control Channel, PDCCH) is not monitored in a search space set (search space set) indicated by a higher layer parameter (for example, recoverySearchSpaceId) within a time window, and the maximum quantity of times for sending the BFRQ is not reached, the UE retransmits the BFRQ.

The UE monitors a base station response (gNB response): after receiving the BFRQ, the base station will send a response (response) in a PDCCH on a control resource set (Control Resource Set, CORESET)-BFR. Cyclic redundancy check (Cyclic Redundancy Check, CRC) of a downlink control information format (DCI format) of the PDCCH is scrambled by a cell-radio network temporary identifier (Cell-Radio Network Temporary Identifier, C-RNTI) or a modulation and coding scheme (Modulation and Coding Scheme, MCS)-C-RNTI.

(6) About a Bandwidth Part (Bandwidth Part, BWP) and CORESET

In NR Rel-15, the maximum channel bandwidth (channel bandwidth) of each carrier is 400 MHz. However, considering the capability of the UE, the maximum bandwidth supported by the UE may be less than 400 MHz, and the UE can work in a plurality of small BWPs. Each bandwidth part corresponds to a parameter set (Numerology), bandwidth (bandwidth), and a frequency location (frequency location). For an FDD system or paired spectrum (paired spectrum), the base station configures the UE with at most four downlink BWPs and at most four uplink BWPs. For a time-division duplex (time-division duplex, TDD) system or an unpaired spectrum (unpaired spectrum), the base station configures for the UE at most four downlink/uplink BWP pairs (DL/UL BWP pair). A center carrier frequency of the DL BWP and UL BWP in each DL/UL BWP pair is the same. In addition, a default DL BWP or default DL/UL BWP pair will be configured for each UE. The default DL BWP or default DL/UL BWP pair is usually a BWP with a relatively small bandwidth. When the UE has not received data or detected the PDCCH for a long time, the UE will switch from a currently active BWP to the default DL BWP or default DL/UL BWP pair based on a timer, thus achieving the effect of power saving. Handover of the active BWP (active BWP) is implemented by radio resource control (Radio Resource Control, RRC), DCI, or the timer. For example, if DCI on a first CORESET indicates that the UE is handed over to a second CORESET, after the UE is handed over to the second CORESET, a BWP in which the CORESET is located is the active BWP. The maximum number of CORESETs in each BWP of each cell is 3.

A CORESET numbered with 0 (CORESET #0) is configured by a master information block (master information block, MIB) in a physical broadcast channel (Physical Broadcast Channel, PBCH), which is used for scheduling system information (system information).

The beam described herein may also be called a spatial filter (spatial filter), a spatial domain transmission filter (spatial domain transmission filter), or the like.

The beam information described herein may also be expressed by another word, such as a transmission configuration indication (Transmission Configuration Indication, TCI) state (state) information, quasi-co-located (Quasi-co-located, QCL) information, spatial relation (spatial relation) information, or the like.

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

The term "include" and any other variants in the specification and claims of this application mean to cover the non-exclusive inclusion, for example, a process, method, system, product, or device that includes a list of steps or units is not necessarily limited to those steps or units, but may include other steps or units not expressly listed or inherent to such a process, method, product, or device. In addition, "and/or" used in the specification and the claims means at least one of the connected objects. For example, A and/or B represents the following three cases: only A exists, only B exists, and both A and B exist.

In the embodiments of the present disclosure, the term such as "exemplary" or "for example" is used to represent an example, an instance, or a description. Any embodiment or design solution described as "exemplary" or "for example" in the embodiments of the present disclosure should not be construed as being more preferred or advantageous than other embodiments or design solutions. To be precise, the use of the term such as "exemplary" or "for example" is intended to present a related concept in a specific manner.

The technology described in this specification is not limited to a long term evolution (Long Term Evolution, LTE)/LTE-advanced (LTE-Advanced, LTE-A) system, and may also be used in various wireless communications systems such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems.

The terms "system" and "network" are often exchanged in use. A CDMA system may implement radio technologies such as CDMA2000, universal terrestrial radio access (Universal Terrestrial Radio Access, UTRA) and the like. UTRA includes wideband CDMA (Wideband Code Division Multiple Access, WCDMA) and other CDMA variants. A TDMA system may implement radio technologies such as a global system for mobile communication (Global System for Mobile Communication, GSM) and the like. The OFDMA system can implement radio technologies such as ultra mobile broadband (Ultra Mobile Broadband, UMB), evolved-UTRA (Evolution-UTRA, E-UTRA), IEEE 802.11 (Wi-Fi), IEEE 802.16 (WiMAX), IEEE 802.20, and Flash-OFDM. UTRA and the E-UTRA are parts of a universal mobile telecommunications system (Universal Mobile Telecommunications System, UMTS). LTE and advanced LTE (for example, LTE-A) are new UMTS versions that use E-UTRA. The UTRA, E-UTRA, UMTS, LTE, LTE-A and GSM are described in documents from an organization named "3rd generation partnership project (3rd Generation Partnership Project, 3GPP)". CDMA2000 and UMB are described in a document from an origination named "3rd Generation Partnership Project 2" (3GPP2). The technologies described in this specification may also be used in the foregoing systems and radio technologies, and may also be used in another system and radio technology.

Figure 5:
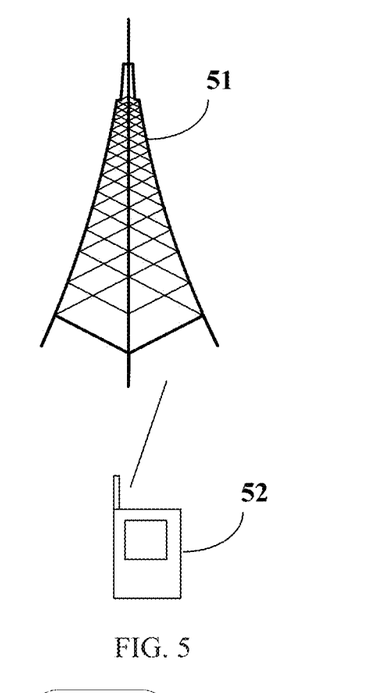
FIG. 5 is a schematic architectural diagram of a wireless communications system according to an embodiment of the present disclosure.

Embodiments of the present disclosure will be described below with reference to the accompanying drawings. A transmission method and a device according to the embodiments of the present disclosure may be applied to a wireless communications system. Referring to FIG. 5, it is a schematic architectural diagram of a wireless communications system according to an embodiment of the present disclosure. As shown in FIG. 5, the wireless communications system may include: a network device 51 and a terminal 52. The terminal 52 may be denoted as UE52, and the terminal 52 may communicate with the network device 51 (to transmit signaling or transmit data). In actual application, a connection between the foregoing devices may be a wireless connection. To conveniently and intuitively represent a connection relationship between the devices, a solid line is used for illustration in FIG. 5.

The network device 51 according to this embodiment of the present disclosure may be a base station, and the base station may be a commonly used base station, an evolved node base station (evolved node base station, eNB), or a network device (for example, a next generation node base station (next generation node base station, gNB) or a transmission and reception point (transmission and reception point, TRP)) in a 5G system, or another device.

The terminal 52 according to this embodiment of the present disclosure may be a mobile phone, a tablet computer, a notebook computer, an ultra-mobile personal computer (Ultra-Mobile Personal Computer, UMPC), a netbook, a personal digital assistant (Personal Digital Assistant, PDA), a mobile internet device (Mobile Internet Device, MID), a wearable device (Wearable Device), a vehicle-mounted device, or the like.

Figure 6:
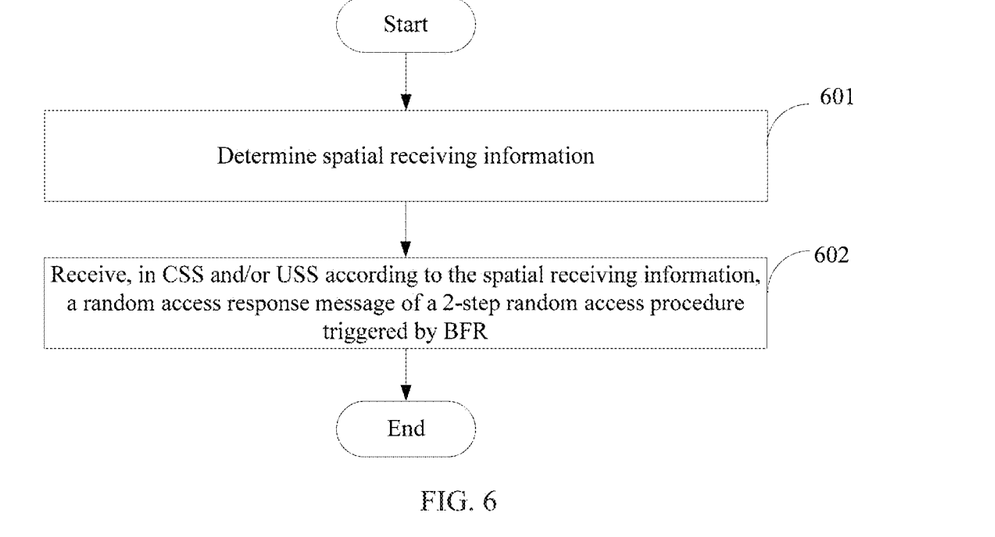
FIG. 6 is a flow chart of a transmission method according to an embodiment of the present disclosure.

Referring to FIG. 6, an embodiment of the present disclosure further provides a transmission method. The method may be performed by a terminal and includes step 601 and step 602.

Step 601: Determine first spatial information (or called spatial receiving information).

In this embodiment of the present disclosure, after a beam failure in a PCell or secondary sell (Secondary Cell, SCell), the UE can initiate a 2-step random access procedure triggered by a BFR to perform a process of beam failure recovery.

Step 602: Receive, according to the first spatial information, a random access response message of the 2-step random access procedure triggered by the BFR in common search space (Common Search Space, CSS) and/or UE-specific search space (UE-specific Search Space, USS).

In some implementations, in step 601, the first spatial information may be determined according to first information.

The first information includes one or more of the following:
  (1) beam information before the 2-step random access procedure triggered by the BFR;
  (2) a transmission configuration indication (Transmission Configuration Indication, TCI) state before the 2-step random access procedure triggered by the BFR;
  (3) quasi-co-located (Quasi-co-located, QCL) before the 2-step random access procedure triggered by the BFR;
  (4) beam information of an SSB associated with transmission of a random access message;
  (5) a TCI state of an SSB associated with transmission of a random access message;
  (6) a QCL of an SSB associated with transmission of a random access message;
  (7) beam information of an indication from a network side;
  (8) a TCI state of an indication from a network side; or
  (9) a QCL of an indication from a network side.

In this embodiment, according to the foregoing first information, it can be ensured that the terminal and a base station have the same understanding of receiving spatial information of a downlink signal, and it can be further ensured that the terminal can receive a random access response message in a selected beam direction when the base station sends the random access response message.

In some implementations, beam information of a control resource set (CORESET) associated with the CSS or USS is the same as one or more of the following: (1) the beam information before the 2-step random access procedure triggered by the BFR is initiated; or (2) the beam information of the SSB associated with the transmission of the random access message.

In some implementations, a TCI state of the CORESET associated with the CSS or USS is the same as one or more of the following: (1) the TCI state before the 2-step random access procedure triggered by the BFR is initiated; or (2) the TCI state of the SSB associated with the transmission of the random access message.

In some implementations, a QCL of the CORESET associated with the CSS or USS is the same as one or more of the following: (1) the QCL before the 2-step random access procedure triggered by the BFR is initiated; (2) or the QCL of the SSB associated with the transmission of the random access message.

Optionally, the CSS, USS, or CORESET may be configured by the network side.

In some implementations, before indication information is received, the first spatial information is determined according to the beam information, TCI state, or QCL before the 2-step random access procedure triggered by the BFR, or according to the beam information, TCI state, or QCL of the SSB associated with the transmission of the random access message.

In some implementations, at a first time, the first spatial information is determined according to the beam information, TCI state or QCL before the 2-step random access procedure triggered by the BFR, or according to the beam information, TCI state, or QCL of the SSB associated with the transmission of the random access message. A time interval between the first time and a receiving time of the indication information is less than or equal to a first preset time.

Duration of the first preset time may be predefined or configured by the network, and a unit of the first preset time may be a sub-frame, a time slot, or a symbol.

In some implementations, at a second time, first spatial information is determined according to the indication information, and a time interval between the second time and a receiving time of the indication information is greater than or equal to a second preset time.

Duration of the second preset time may be predefined or configured by the network, and a unit of the second preset time may be a sub-frame, a time slot, or a symbol. The indication information includes the beam information, TCI state, or QCL of an indication from the network side.

For example, a time for receiving the indication information is a first time, and k time units are spaced between a second time and the first time. Before the second time, the first spatial information may be determined according to the beam information, TCI state, or QCL before the 2-step random access procedure triggered by the BFR, or according to the beam information, TCI state, or QCL of the SSB associated with the transmission of the random access message. After the second time, the first spatial information is determined according to the indication information. K is predefined or configured by the network.

In some implementations, based on what is shown in FIG. 6, the method further includes:
  receiving a second random access response message in the CSS and/or USS if falling back to 4-step random access procedure.

The second random access response message is a random access response message of the 4-step random access procedure.

Exemplarily, if a fallback of a random access response (fallback RAR) is received, the UE will send Msg3 corresponding to the 4-step random access procedure, and then receive Msg4 corresponding to the 4-step random access procedure in the CSS/USS.

In some implementations, based on what is shown in FIG. 6, the method further includes: determining second spatial information (or spatial sending information) after the random access response message is received; and sending feedback information of the random access response message according to the second spatial information.

For example, the feedback information is a hybrid automatic repeat request acknowledgement (Hybrid Automatic Repeat Request Acknowledgement, HARQ-ACK).

In some implementations, the second spatial information may be determined in the following ways. The second spatial information is determined according to second information.

The second information includes one or more of the following:
  (1) beam information before the 2-step random access procedure triggered by the BFR;
  (2) a TCI state before the 2-step random access procedure triggered by the BFR;
  (3) a QCL before the 2-step random access procedure triggered by the BFR;
  (4) beam information of an SSB associated with transmission of a random access message;
  (5) a TCI state of an SSB associated with transmission of a random access message;
  (6) a QCL of an SSB associated with transmission of a random access message;
  (7) beam information of an indication from a network side;
  (8) a TCI state of an indication from a network side; or
  (9) a QCL of an indication from a network side.

In this embodiment, according to the second information, it can be ensured that the terminal and the base station have the same understanding of the spatial information of transmitting and receiving signals, and it can be further ensured that the base station can receive feedback information of the random access response message in a selected beam direction when the terminal sends the feedback information.

In some implementations, beam information of a physical uplink control channel (PUCCH) resource carrying the feedback information is the same as one or more of the following:
  (1) beam information before the 2-step random access procedure triggered by the BFR; or
  (2) beam information of an SSB associated with transmission of a random access message.

In some implementations, a TCI state of the PUCCH resource carrying the feedback information is the same as one or more of the following:
  (1) a TCI state before the 2-step random access procedure triggered by the BFR; or
  (2) a TCI state of an SSB associated with transmission of a random access message.

In some implementations, a QCL of the PUCCH resource carrying the feedback information is the same as one or more of the following:
  (1) a QCL before the 2-step random access procedure triggered by the BFR; or
  (2) a QCL of an SSB associated with transmission of a random access message.

In some implementations, before indication information is received, the second spatial information is determined according to the beam information, TCI state, or QCL before the 2-step random access procedure triggered by the BFR, or according to the beam information, TCI state, or QCL of the SSB associated with the transmission of the random access message.

In some implementations, at a third time, the second spatial information is determined according to the beam information, TCI state, or QCL before the 2-step random access procedure triggered by the BFR, or according to the beam information, TCI state, or QCL of the SSB associated with the transmission of the random access message. A time interval between the third time and a receiving time of the indication information is less than or equal to a third preset time.

Duration of the third preset time may be predefined or configured by the network, and a unit of the third preset time may be a sub-frame, a time slot, or a symbol.

In some implementations, at a fourth time, the second spatial information is determined according to the indication information, and a time interval between the fourth time and a receiving time of the indication information is greater than or equal to a fourth preset time.

Duration of the fourth preset time may be predefined or configured by the network, and a unit of the fourth preset time may be a sub-frame, a time slot, or a symbol. The indication information includes the beam information, TCI state, or QCL of an indication from the network side.

For example, a time for receiving the indication information is a third time, and K time units are spaced between a fourth time and the third time. Before the fourth time, the second spatial information may be determined according to the beam information, TCI state, or QCL before the 2-step random access procedure triggered by the BFR, or according to the beam information, TCI state, or QCL of the SSB associated with the transmission of the random access message. After the fourth time, the second spatial information is determined according to the indication information. K is predefined or configured by the network.

In this embodiment of the present disclosure, the terminal can receive, in common search space and/or UE-specific search space, the random access response message of the 2-step random access procedure triggered by beam failure recovery (BFR), so that reliability of a communications system can be improved.

Next, a process of the beam failure recovery performed through the 2-step random access procedure will be introduced with reference to embodiments 1 to 6.

Embodiment 1

When the UE receives a random access response message in the common search space (Common Search Space, CSS), it receives the random access response message according to the TCI state, beam information, or QCL associated with sending of a random access message (MsgA).

A channel carrying the random access response message may include: (1) a physical downlink control channel (Physical Downlink Control Channel, PDCCH) carrying the random access response message (MsgB), or (2) a physical downlink shared data channel (PDSCH) carrying the random access response message (MsgB).

The random access message (MsgA) is sent through a physical random access channel (Physical Random Access Channel, PRACH) and/or a physical uplink shared channel (Physical Uplink Shared Channel, PUSCH), where the PRACH has an association with the SSB.

Embodiment 2

In this embodiment, the following three alternative ways are included.
Way 1: When the UE receives the random access response message in the UE-specific search space (UE-specific Search Space, USS), it receives the random access response message according to the TCI state before the 2-step random access procedure is initiated.

For example, before the 2-step random access procedure is initiated, if the TCI state of the UE is A, the UE will receive the random access response message according to a beam direction corresponding to the TCI state A when detecting the random access response message in the UE-specific search space.
Way 2: When the UE receives the random access response message in the UE-specific search space, it receives the random access response message according to the TCI state, beam information, or QCL associated with the sending of the random access message (MsgA).

For example, the UE sends the MsgA using a PRACH associated with SSB n, then when detecting the random access response message in the UE-specific search space, the UE receives the random access response message based on the same spatial receiving information as that for receiving the SSB n.
Way 3: When the UE receives the random access response message in the UE-specific search space, it receives the random access response message according to the TCI state before the 2-step random access procedure is initiated and the TCI state, beam information, or QCL related to the sending of the random access message (MsgA).

That is, the UE receives the random access response message not only according to a beam direction corresponding to the TCI state before the 2-step random access procedure is initiated, but also according to the TCI state, beam information, or QCL related to the sending of the random access message (MsgA).

It can be understood that as long as the random access response message is detected in one beam direction, it is not necessary to perform detection in another beam direction.

Embodiment 3

In this embodiment, the following two alternative ways are included.
Way 1: The UE initiates the 2-step random access procedure and receives a random access response success message. When the UE feeds back a corresponding HARQ-ACK, spatial sending information of a PUCCH resource carrying the HARQ-ACK is determined according to the TCI state before the 2-step random access procedure is initiated, and the UE sends the HARQ-ACK according to the spatial sending information.

For example, before the 2-step random access procedure is initiated, if the TCI state of the UE is A, when the PUCCH is sent, the UE sends the corresponding HARQ-ACK according to a spatial direction corresponding to the TCI state A.
Way 2: The UE initiates the 2-step random access procedure and receives a random access response success message. When the UE feeds back a corresponding HARQ-ACK, spatial sending information of a PUCCH resource carrying the HARQ-ACK is determined according to the TCI state, beam information, or QCL related to the sending of the random access information (MsgA), and the UE sends the HARQ-ACK according to the spatial sending information.

For example, the UE sends the MsgA using a PRACH associated with SSB n, and then when the PUCCH is sent, the UE sends the HARQ-ACK based on the same spatial sending information as that for receiving the SSB n.

Embodiment 4

In this embodiment, the following four alternative ways are included.
Way 1: When the UE performs the 2-step random access procedure triggered by the BFR or has completed the 2-step random access procedure, before the UE receives the TCI state, beam information, or QCL indicated by a network device (for example, an indication through RRC or MAC CE), UE determines spatial receiving information according to the TCI state before the 2-step random access procedure is initiated, and receives downlink signal (including signal carried by the PDCCH/PDSCH) according to the spatial receiving information.
Way 2: When the UE performs the 2-step random access procedure triggered by the BFR or has completed the 2-step random access procedure, before the UE receives the TCI state, beam information, or QCL indicated by a network device (for example, an indication through RRC or MAC CE), UE determines spatial receiving information according to the TCI state, beam information, or QCL related to the transmission of the random access message (MsgA), and receives downlink signal (including signal carried by the PDCCH/PDSCH) according to the spatial receiving information.
Way 3: When the UE performs the 2-step random access procedure triggered by the BFR or has completed the 2-step random access procedure, before k time units after the UE receives a network indication (for example, an indication through the RRC or MAC CE), UE determines spatial receiving information according to the TCI state before the 2-step random access procedure is initiated or according to the TCI state, beam information, or QCL related to the sending of the random access message (the MsgA), and receives downlink signal (including signal carried by the PDCCH/PDSCH) according to the spatial receiving information.

Way 4: When the UE performs the 2-step random access procedure triggered by the BFR or has completed the 2-step random access procedure, after k time units after the UE receives an indication from network device (for example, an indication through the RRC or MAC CE), the UE determines spatial receiving information by using the TCI state, beam information, or QCL indicated by the network device, and receives downlink signal according to the spatial receiving information.

Embodiment 5

In this embodiment, the following four alternative ways are included.

Way 1: When the UE performs the 2-step random access procedure triggered by the BFR or has completed the 2-step random access procedure, before the UE receives the TCI state, beam information, or QCL indicated by a network device (for example, an indication through RRC or MAC CE), UE determines spatial sending information according to the TCI state before the 2-step random access procedure is initiated, and sends uplink signal (including signal carried by the PUCCH/PUSCH) according to the spatial sending information.

Way 2: When the UE performs the 2-step random access procedure triggered by the BFR or has completed the 2-step random access procedure, before the UE receives the TCI state, beam information, or QCL indicated by a network device (for example, an indication through RRC or MAC CE), UE determines spatial sending information according to the TCI state, beam information, or QCL related to the sending of the random access message (MsgA), and sends uplink signal (including signal carried by the PUCCH/PUSCH) according to the spatial sending information.

Way 3: When the UE performs the 2-step random access procedure triggered by the BFR or has completed the 2-step random access procedure, before k time units after the UE receives a network indication (for example, an indication through RRC or MAC CE), UE determines spatial sending information according to the TCI state before the 2-step random access procedure is initiated or according to the TCI state, beam information, or QCL related to the sending of the random access message (the MsgA), and sends uplink signal (including signal carried by the PUCCH/PUSCH) according to the spatial sending information.

Way 4: When the UE performs the 2-step random access procedure triggered by the BFR or has completed the 2-step random access procedure, after k time units after the UE receives a network indication (for example, an indication through RRC or MAC CE), UE determines spatial sending information according to the TCI state, beam information, or QCL of the network indication, and sends uplink signal (including a signal carried by the PUCCH/PUSCH) according to the spatial sending information.

Embodiment 6

When the UE performs the 2-step random access procedure triggered by the BFR, the UE receives a downlink message of the network in specific search space or a CORESET.

Optionally, the search space or CORESET may be configured by the network.

Optionally, the PDCCH carrying the downlink message may be:
  (1) a PDCCH carrying downlink grant (DL grant), where the DL grant does not schedule transmission of downlink data;
  (2) a PDCCH that schedules a PDSCH carrying the random access response message (MsgB); or
  (3) a PDCCH carrying uplink grant (UL grant).

Figure 7:
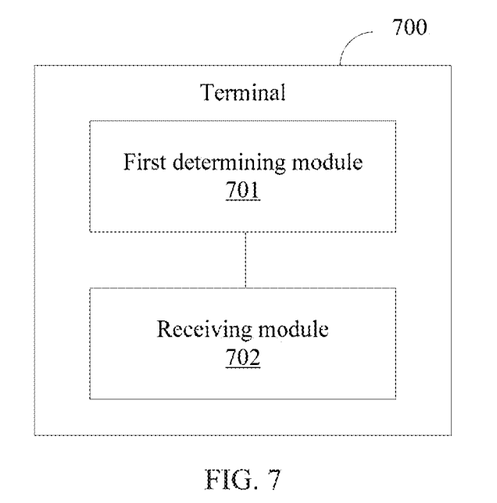
FIG. 7 is a first schematic diagram of a terminal according to an embodiment of the present disclosure.

Referring to FIG. 7, an embodiment of the present disclosure further provides a terminal. The terminal 700 includes:
  a first determining module 701, configured to determine first spatial information; and
  a receiving module 702, configured to receive, according to the first spatial information, a random access response message of a 2-step random access procedure triggered by beam failure recovery (BFR) in common search space (CSS) and/or UE-specific search space (USS).

In some implementations, the first determining module 701 is further configured to determine the first spatial information according to first information.

The first information includes one or more of the following:
  beam information before the 2-step random access procedure triggered by the BFR;
  a TCI state before the 2-step random access procedure triggered by the BFR;
  a QCL before the 2-step random access procedure triggered by the BFR;
  beam information of an SSB associated with transmission of a random access message;
  a TCI state of an SSB associated with transmission of a random access message;
  a QCL of an SSB associated with transmission of a random access message;
  beam information of an indication from a network side;
  a TCI state of an indication from a network side; or
  a QCL of an indication from a network side.

In some implementations, beam information of the CORESET associated with the CSS or USS is the same as one or more of the following:
  beam information before the 2-step random access procedure triggered by the BFR is initiated; or
  beam information of an SSB associated with transmission of a random access message; or
  the TCI state of the CORESET associated with the CSS or USS is the same as one or more of the following:
  a TCI state before the 2-step random access procedure triggered by the BFR is initiated; or
  a TCI state of an SSB associated with transmission of a random access message; or
  a QCL of the CORESET associated with the CSS or USS is the same as one or more of the following:

a QCL before the 2-step random access procedure triggered by the BFR is initiated; or a QCL of an SSB associated with transmission of a random access message.

In some implementations, the first determining module 701 is further configured to:

determine, before indication information is received, the first spatial information according to the beam information, TCI state, or QCL before the 2-step random access procedure triggered by the BFR, or according to the beam information, TCI state, or QCL of the SSB associated with the transmission of the random access message.

or determine, at a first time, the first spatial information according to the beam information, TCI state, or QCL before the 2-step random access procedure triggered by the BFR, or according to the beam information, TCI state, or QCL of the SSB associated with transmission of a random access message, where a time interval between the first time and a receiving time of the indication information is less than or equal to a first preset time;

or determine, at a second time, the first spatial information according to the indication information, where a time interval between the second time and a receiving time of the indication information is greater than or equal to a second preset time; and the indication information includes the beam information, TCI state, or QCL of the indication from the network side.

In some implementations, the receiving module 702 is further configured to:

receive a second random access response message in the CSS and/or USS if falling back to 4-step random access procedure.

The second random access response message is a random access response message of the 4-step random access procedure.

In some implementations, the terminal 700 shown in FIG. 7 further includes:

a second determining module, configured to determine second spatial information after the random access response message is received; and a sending module, configured to send feedback information of the random access response message according to the second spatial information.

In some implementations, the second determining module is further configured to determine the second spatial information according to second information.

The second information includes one or more of the following:

beam information before the 2-step random access procedure triggered by the BFR;

a TCI state before the 2-step random access procedure triggered by the BFR;

a QCL before the 2-step random access procedure triggered by the BFR;

beam information of an SSB associated with transmission of a random access message;

a TCI state of an SSB associated with transmission of a random access message;

a QCL of an SSB associated with transmission of a random access message;

beam information of an indication from a network side;

a TCI state of an indication from a network side; or a QCL of an indication from a network side.

In some implementations, beam information of a PUCCH resource carrying the feedback information is the same as one or more of the following:

beam information before the 2-step random access procedure triggered by the BFR; or beam information of an SSB associated with transmission of a random access message;

or a TCI state of the PUCCH resource carrying the feedback information is the same as one or more of the following:

a TCI state before the 2-step random access procedure triggered by the BFR; or a TCI state of an SSB associated with transmission of a random access message;

or a QCL of the PUCCH resource carrying the feedback information is the same as one or more of the following:

a QCL before the 2-step random access procedure triggered by the BFR; or a QCL of an SSB associated with transmission of a random access message.

In some implementations, the second determining module is further configured to:

determine, before indication information is received, the second spatial information according to the beam information, TCI state, or QCL before the 2-step random access procedure triggered by the BFR, or according to the beam information, TCI state, or QCL of the SSB associated with the transmission of the random access message;

or determine, at a third time, the second spatial information according to the beam information, TCI state, or QCL before the 2-step random access procedure triggered by the BFR, or according to the beam information, TCI state, or QCL of the SSB associated with the transmission of the random access message, where a time interval between the third time and a receiving time of the indication information is less than or equal to a third preset time; or determine, at a fourth time, the second spatial information according to the indication information, where a time interval between the fourth time and a receiving time of the indication information is greater than or equal to a fourth preset time, where the indication information includes the beam information, TCI state, or QCL of the indication from the network side.

The terminal according to this embodiment of the present disclosure may perform the foregoing method embodiment shown in FIG. 6. An implementation principle and a technical effect of the terminal are similar to those of the method embodiment, and details are not described again in this embodiment.

In the embodiments of the present disclosure, the terminal can receive, in common search space and/or UE-specific search space, the random access response message of the 2-step random access procedure triggered by the beam failure recovery (BFR), so that reliability of a communications system can be improved.

Figure 8:
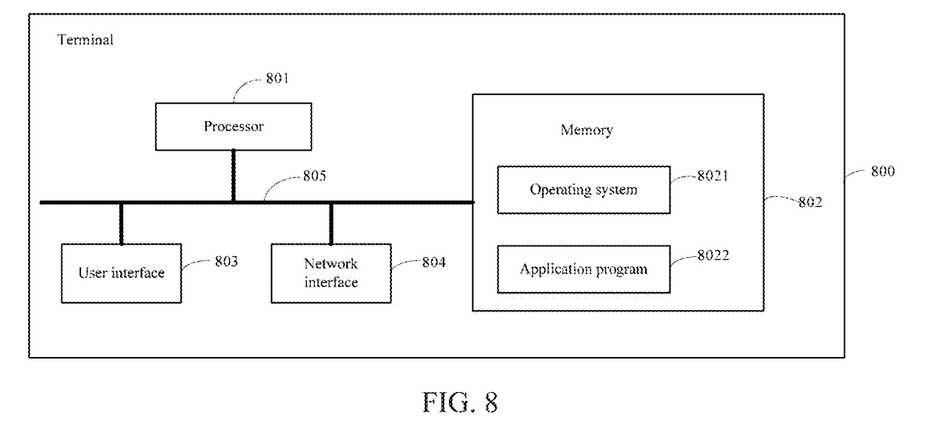
FIG. 8 is a second schematic diagram of a terminal according to an embodiment of the present disclosure.

As shown in FIG. 8, a terminal 800 shown in FIG. 8 includes: at least one processor 801, a memory 802, at least one network interface 804, and a user interface 803. Various components of the terminal 800 are coupled by using a bus system 805. It can be understood that the bus system 805 is configured to implement a connection and communication between these components. In addition to a data bus, the bus system 805 further includes a power bus, a control bus, and a state signal bus. However, for clear description, various buses are marked as the bus system 805 in FIG. 8.

The user interface 803 may include a display, a keyboard, a clicking device (for example, a mouse, a trackball (trackball)), a touch panel, a touchscreen, or the like It can be understood that the memory 802 in this embodiment of the present disclosure may be a volatile memory or a non-volatile memory, or may include both a volatile memory and a non-volatile memory. The nonvolatile memory may be a read-only memory (Read-only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. Through exemplary but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DRRAM). The memory 802 in the system and the method that are described in the embodiments of the present disclosure is to include but is not limited to these memories and any other suitable types of memories.

In some implementations, the memory 802 stores the following elements: an executable module or a data structure, or a subset thereof, or an extension set thereof: an operating system 8021 and an application program 8022.

The operating system 8021 includes various system programs, such as a framework layer, a core library layer, and a driver layer, and is configured to implement various basic services and process hardware-based tasks. The application program 8022 includes various application programs, for example, a media player (Media Player) and a browser (Browser), and is configured to implement various application services. A program for implementing the method in this embodiment of the present disclosure may be included in the application program 8022.

In an embodiment of the present disclosure, when a program or an instruction stored in the memory 802 is called, alternatively, when a program or an instruction stored in the application program 8022 is executed, the steps of the method in FIG. 6 are implemented.

The terminal according to this embodiment of the present disclosure may perform the foregoing method embodiment shown in FIG. 6. An implementation principle and a technical effect of the terminal are similar to those of the method embodiment, and details are not described again in this embodiment.

The method or algorithm steps described in combination with content disclosed in the present disclosure may be implemented by hardware, or may be implemented by a processor by executing software instructions. The software instruction may be formed by a corresponding software module. The software module may be stored in a random access memory (Random Access Memory, RAM), a flash memory, a read-only memory (Read-Only Memory, ROM), an erasable programmable read-only memory (Erasable PROM, EPROM), an electrically erasable programmable read-only memory (Electrically EPROM, EEPROM), a register, a hard disk, a mobile hard disk, a read-only compact disc, or a storage medium of any other form known in the art. An exemplary storage medium is coupled to the processor, so that the processor can read information from the storage medium and can write information to the storage medium. Certainly, the storage medium may also be a component of the processor. The processor and the storage medium may be located in an application specific integrated circuit (Application Specific Integrated Circuit, ASIC). In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When implemented by software, the foregoing functions may be stored in a computer-readable medium or transmitted as one or more instructions or codes in the computer-readable medium. The computer-readable medium includes a computer storage medium and a communications medium, where the communications medium includes any medium that enables a computer program to be transmitted from one place to another. The storage medium may be any usable medium accessible to a general-purpose or dedicated computer.

The objectives, technical solutions, and beneficial effects of the present disclosure are further described in detail in the foregoing description of embodiments. It should be understood that the foregoing descriptions are merely description of embodiments of the present disclosure, and are not intended to limit the protection scope of the present disclosure. Any modification, equivalent replacement, improvement, or the like made on the basis of the technical solutions of the present disclosure shall fall within the protection scope of the present disclosure.

A person skilled in the art should understand that the embodiments of the present disclosure can be provided as a method, a system, or a computer program product. Therefore, the embodiments of the present disclosure may take the form of a hardware only embodiment, a software only embodiment, or an embodiment with both software and hardware. Moreover, the embodiments of the present disclosure may use a form of a computer program product that is implemented on one or more computer-usable storage media (including but not limited to a magnetic disk memory, a CD-ROM, an optical memory, and the like) that include a computer-usable program code.

The embodiments of the present disclosure are described with reference to the flowcharts and/or block diagrams of the methods, devices (systems), and computer program products according to the embodiments of the present disclosure. It should be understood that each process and/or block in the flowchart and/or block diagram as well as a combination of processes and/or blocks in the flowchart and/or block diagram may be implemented by computer program instructions. These computer program instructions can be provided to a general-purpose computer, a special-purpose computer, an embedded processor, or a processor of another programmable data processing device to generate a machine, so that an apparatus configured to implement functions specified in one or more procedures of a flowchart and/or one or more blocks of a block diagram is generated by using the instructions executed by the computer or the processor of the another programmable data processing device.

These computer program instructions may also be stored in a computer readable memory that can instruct the computer or another programmable data processing device to work in a specific manner, so that the instructions stored in the computer readable memory generate an artifact that includes an instruction apparatus. The instruction apparatus implements a specific function in one or more procedures of the flowchart and/or in one or more blocks of the block diagram.

These computer program instructions may also be loaded onto a computer or another programmable data processing device, so that a series of operation steps are performed on the computer or another programmable device to produce computer-implemented processing, thereby providing instructions executed on the computer or other programmable devices to implement steps for the function specified in one or more processes of the flowchart and/or one or more blocks of the block diagram.

It can be understood that the embodiments described in some embodiments of the present disclosure may be implemented by hardware, software, firmware, middleware, a microcode, or a combination thereof. For implementation with hardware, a module, unit, submodule, subunit, and the like may be implemented in one or more application specific integrated circuits (Application Specific Integrated Circuits, ASIC), digital signal processors (Digital Signal Processing, DSP), digital signal processing devices (DSP Device, DSPD), programmable logic devices (Programmable Logic Device, PLD), field-programmable gate arrays (Field-Programmable Gate Array, FPGA), general processors, controllers, micro-controllers, micro-processors, and other electronic units for implementing the functions of this application, or their combinations.

Obviously, a person skilled in the art can make various modifications and variations to the embodiments of the present disclosure without departing from the spirit and scope of the present disclosure. In this way, the present disclosure is intended to include these modifications and variations to the embodiments of the present disclosure provided that they fall within the scope of the claims of the present disclosure and their equivalent technologies.

The invention claimed is:

1. A transmission method, comprising:
   determining first spatial information;
   receiving, in common search space (CSS) and/or UE-specific search space (USS) according to the first spatial information, a random access response message of a 2-step random access procedure triggered by beam failure recovery (BFR);
   determining second spatial information after the random access response message is received; and
   sending feedback information of the random access response message according to the second spatial information.

2. The method according to claim 1, wherein the determining first spatial information comprises: determining the first spatial information according to first information,
   wherein the first information comprises one or more of the following:
   beam information before the 2-step random access procedure;
   beam information of a synchronization signal block (SSB) associated with transmission of a random access message; or
   beam information of an indication from a network side.

3. The method according to claim 2, wherein the determining the first spatial information according to first information comprises:
   determining, before indication information is received, the first spatial information according to the beam information before the 2-step random access procedure, or according to the beam information of the SSB associated with the transmission of the random access message; or
   determining, at a first time, the first spatial information according to the beam information before the 2-step random access procedure, or according to the beam information of the SSB associated with the transmission of the random access message, wherein a time interval between the first time and a receiving time of the indication information is less than or equal to a first preset time; or
   determining, at a second time, the first spatial information according to the indication information, wherein a time interval between the second time and a receiving time of the indication information is greater than or equal to a second preset time, and
   wherein the indication information comprises the beam information of the indication from the network side.

4. The method according to claim 1, wherein beam information of a control resource set (CORESET) associated with the CSS or USS is the same as one or more of the following:
   beam information before the 2-step random access procedure; or
   beam information of an SSB associated with transmission of a random access message.

5. The method according to claim 1, wherein the method further comprises:
   receiving a second random access response message in the CSS and/or USS in a case of falling back to 4-step random access procedure,
   wherein the second random access response message is a random access response message of the 4-step random access procedure.

6. The method according to claim 1, wherein the determining second spatial information comprises: determining the second spatial information according to second information,
   wherein the second information comprises one or more of the following:
   beam information before the 2-step random access procedure;
   beam information of an SSB associated with transmission of a random access message; or
   beam information of an indication from a network side.

7. The method according to claim 6, wherein the determining the second spatial information according to second information comprises:
   determining, before indication information is received, the second spatial information according to the beam information before the 2-step random access procedure, or according to the beam information of the SSB associated with the transmission of the random access message; or
   determining, at a third time, the second spatial information according to the beam information before the 2-step random access procedure, or according to the beam information of the SSB associated with the transmission of the random access message, wherein a time interval between the third time and a receiving time of the indication information is less than or equal to a third preset time; or determining, at a fourth time, the second spatial information according to the indication information, wherein a time interval between the fourth time and a receiving time of the indication information is greater than or equal to a fourth preset time, and wherein the indication information comprises the beam information of the indication from the network side.

8. The method according to claim 1, wherein beam information of a physical uplink control channel (PUCCH) resource carrying the feedback information is the same as one or more of the following:

beam information before the 2-step random access procedure; or beam information of an SSB associated with transmission of a random access message.

9. A terminal, comprising: a processor, a memory, and a program that is stored in the memory and that can be run on the processor, wherein when the program is executed by the processor, the program implements:

determining first spatial information;

receiving, in common search space (CSS) and/or UE-specific search space (USS) according to the first spatial information, a random access response message of a 2-step random access procedure triggered by beam failure recovery (BFR);

determining second spatial information after the random access response message is received; and sending feedback information of the random access response message according to the second spatial information.

10. The terminal according to claim 9, wherein the determining first spatial information comprises: determining the first spatial information according to first information, wherein the first information comprises one or more of the following:

beam information before the 2-step random access procedure;

beam information of a synchronization signal block (SSB) associated with transmission of a random access message; or beam information of an indication from a network side.

11. The terminal according to claim 10, wherein the determining the first spatial information according to first information comprises:

determining, before indication information is received, the first spatial information according to the beam information before the 2-step random access procedure, or according to the beam information of the SSB associated with the transmission of the random access message; or determining, at a first time, the first spatial information according to the beam information before the 2-step random access procedure, or according to the beam information of the SSB associated with the transmission of the random access message, wherein a time interval between the first time and a receiving time of the indication information is less than or equal to a first preset time; or determining, at a second time, the first spatial information according to the indication information, wherein a time interval between the second time and a receiving time of the indication information is greater than or equal to a second preset time, and wherein the indication information comprises the beam information of the indication from the network side.

12. The terminal according to claim 9, wherein beam information of a control resource set (CORESET) associated with the CSS or USS is the same as one or more of the following:

beam information before the 2-step random access procedure; or beam information of an SSB associated with transmission of a random access message.

13. The terminal according to claim 9, wherein when the program is executed by the processor, the program further implements:

receiving a second random access response message in the CSS and/or USS in a case of falling back to 4-step random access procedure, wherein the second random access response message is a random access response message of the 4-step random access procedure.

14. The terminal according to claim 9, wherein the determining second spatial information comprises: determining the second spatial information according to second information, wherein the second information comprises one or more of the following:

beam information before the 2-step random access procedure;

beam information of an SSB associated with transmission of a random access message; or beam information of an indication from a network side.

15. The terminal according to claim 14, wherein the determining the second spatial information according to second information comprises:

determining, before indication information is received, the second spatial information according to the beam information before the 2-step random access procedure, or according to the beam information of the SSB associated with the transmission of the random access message; or determining, at a third time, the second spatial information according to the beam information before the 2-step random access procedure, or according to the beam information of the SSB associated with the transmission of the random access message, wherein a time interval between the third time and a receiving time of the indication information is less than or equal to a third preset time; or determining, at a fourth time, the second spatial information according to the indication information, wherein a time interval between the fourth time and a receiving time of the indication information is greater than or equal to a fourth preset time, and wherein the indication information comprises the beam information of the indication from the network side.

16. The terminal according to claim 9, wherein beam information of a physical uplink control channel (PUCCH) resource carrying the feedback information is the same as one or more of the following:

beam information before the 2-step random access procedure; or beam information of an SSB associated with transmission of a random access message.

17. A non-transitory computer-readable storage medium, wherein the non-transitory computer-readable storage medium stores a computer program, and when the computer program is executed by a processor, the computer program implements:

determining first spatial information;
receiving, in common search space (CSS) and/or UE-specific search space (USS) according to the first spatial information, a random access response message of a 2-step random access procedure triggered by beam failure recovery (BFR);
determining second spatial information after the random access response message is received; and
sending feedback information of the random access response message according to the second spatial information.

* * * * *